C. B. DURYEA.
METHOD OF PRODUCING PREDIGESTED FOOD.
APPLICATION FILED FEB. 17, 1910.
1,110,754.
Patented Sept. 15, 1914.
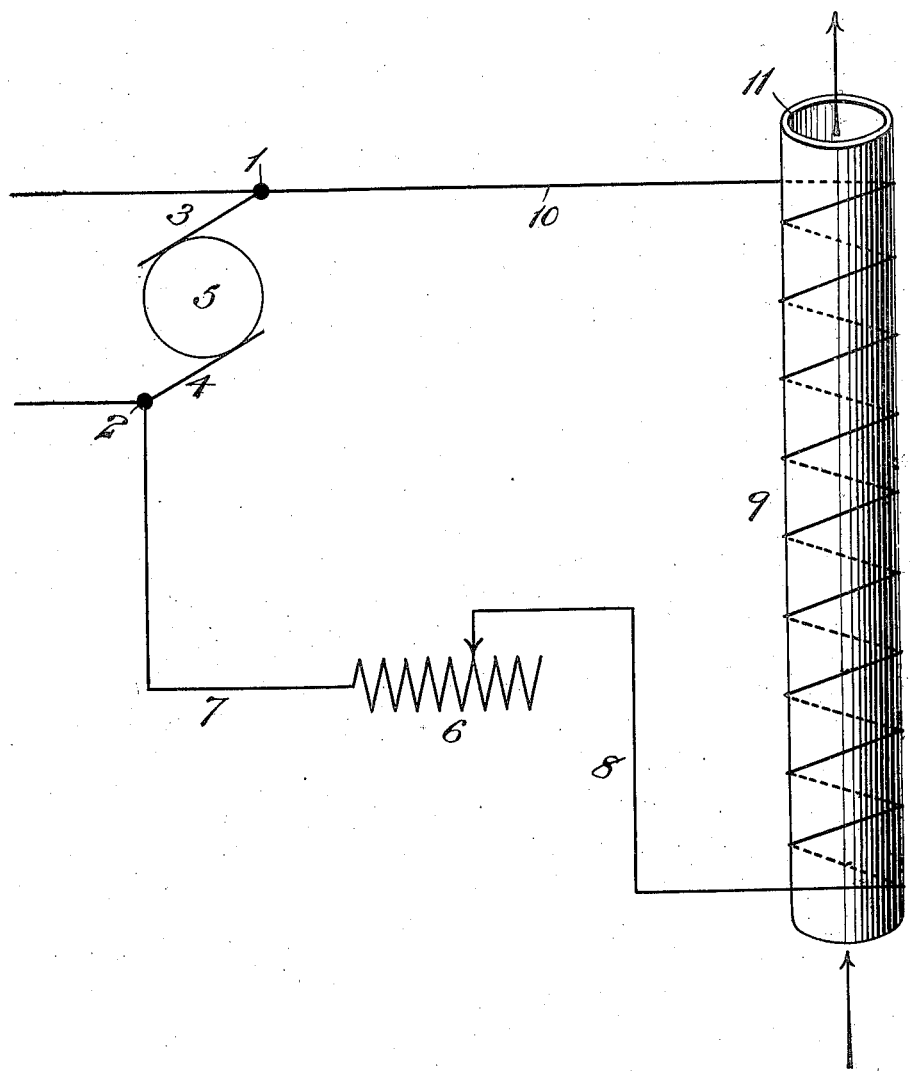

UNITED STATES PATENT OFFICE.

CHESTER B. DURYEA, OF NEW YORK, N. Y.

METHOD OF PRODUCING PREDIGESTED FOOD.

1,110,754.  Specification of Letters Patent.  Patented Sept. 15, 1914.

Application filed February 17, 1910. Serial No. 544,501.

*To all whom it may concern:*

Be it known that I, CHESTER B. DURYEA, a citizen of the United States, and resident of the borough of Manhattan, in the city and State of New York, have invented a new and useful Method of Producing Predigested Food, of which the following is a specification.

This invention relates to a new method for the commercial production of partially or wholly digested cereal or starch products, in one or more steps of which method electric, for instance, alternating electric or electro-magnetic treatments are applied in place of so-called acid hydrolysis or enzymic digestion.

Among the many advantages associated with this new process as such, there may be mentioned an inherent ability to produce somewhat purer products, especially as regards nitrogenous residues, than, for instance, my enzymic maltose process (see my United States Patent No. 746933, December 15, 1903,) is capable of yielding; and finally, perhaps not least important of all, provision for the direct application in this connection of natural power derived energy (hydro-electric), so as to accomplish, in part, what is now largely effected or carried on through the use of fuels.

The commodities yielded by this process are especially advantageous, as in dietetic use, they increase available human energy, generally, and tend to prolong life, through the conservation of metabolic forces. Moreover, their use entirely obviates the specific poisoning or injurious by-effects to which people are at present liable, owing to the frequent indigestion of impure or unsuitable carbohydrate foods, and finally, the commercial cost of the products yielded by this process is extremely moderate.

Turning now to the operation of the process, its basic material may include starchy substances such as cereals, potatoes, etc., or may consist of the ordinary industrial starches, taken from any stage in their manufacture.

In order to produce products of ultra organic and inorganic purity as economically and as expeditiously as possible I prefer, however, to begin with furnishing what is known in the art as "green" starch, *i. e.*, wet or damp unfinished starch, at a stage in manufacture where it has been largely refined or separated from impurities.

The next step, according to my preferential procedure, is to further purify the still somewhat crude "green" starch, in conformity with the principles of my practice of carrying general and specific refining as far as possible, before solution of the starch as such, and its distribution throughout a general menstrum, *i. e.*, before pasting or dissolving the granules. This step is most effectively carried out and the starch granules are best prepared, for the most advantageous practice in subsequent stages of the process, by means of relatively mild acid hydrolysis in aqueous suspension at temperatures not damaging to the granules, followed by dilution and re-running or tabling. (For the philosophy of this procedure and for further details, see my United States Patent No. 916684, March 30, 1909).

Still following the practice I prefer, the purified modified starch resulting from the two preceding steps, is placed in aqueous suspension at a suitable gravity, dependent upon the extent to which the starch had been modified, but which may be, for instance, about 18° Baumé.

The aqueous suspension of preferably purified modified starch, with or without neutralization, partial or complete, of any preexisting acidity, or with or without slight acidification, for example, with HCl to the extent of 0.01% by weight of the water present, (methyl orange or an equivalent being used as the indicator), may then be subjected to a gelantinizing or cooking treatment, at above or below the normal boiling point of the mass, in apparatus of any suitable character, many forms being well known to the art.

Charges of the purified modified starch or paste resulting from the previous steps (after adjustment of acidity from the last-mentioned step, if advisable) are now converted or saccharified to the desired extent through subjecting them to the action of alternating electric currents, for instance, by means of treatment in a vibrating electro-magnetic field of about 440 to 480 oscillations per second.

Neutralization, if necessary, filtration, and further refining and concentration, which may be accomplished in any well known manner, may now be proceeded with.

In further detail the above outlined preferred procedure may be carried out as follows when operating upon starch from maize. The corn may be steeped, ground, seived, etc., in the usual manner for producing crude green starch and the latter deposited upon the well known runs or tables. This crude green starch may then be taken from the runs and placed in suspension in water at a gravity of about 20° Baumé, and acidified with a suitable acid, such as hydrochloric acid, to the extent of about .1 to .2 of one per cent. by weight on the total water present. The temperature of the mass may then be raised by suitable heating means to a point not above 55° C., and heating continued from about three to six hours; during which period the starch is maintained in suspension by any well known or approved agitating means. The charge may then be diluted with water to about 5° Baumé, and passed over the starch tables or runs. The purified modified starch resulting from the above procedure may be mixed with water to a gravity of about 16° Beaumé, and, if necessary, the re-action of the mass adjusted so that it shall have an apparent acidity on the total water present of about 0.01 of one per cent. HCl; menthyl orange being used as the indicator. Cooking may then be proceeded with under a steam pressure of about thirty pounds per square inch, for from about twenty to forty minutes, depending upon the extent of modification of the starch, etc. The cooked charge may then be blown out of the converter; and saccharified by means of treatment in a vibrating electro-magnet field. One practical form of apparatus for this saccharification step is diagrammatically represented in the accompanying drawings, in which 1, 2, denote terminals from any source of electric power (not shown); 3, 4, represent wires leading from these terminals to a commutator 5, for reversing the current and controlling the number of reversals per second. A variable resistance coil is represented by 6 and is connected by a wire 7 to the commutator 5, and by a wire 8 to a solenoid 9, which latter is connected by a wire 10 with the commutator 5. A tube 11 passes through the solenoid 9, which tube may be of any convenient or desired material such, for instance, as gun metal. The charge to be saccharified may be continuously passed through this tube in the solenoid 9 is indicated by arrows, or the tube may be so constructed as to receive a charge, hold it for a period, and then be emptied to be filled again in repeating the operation.

The apparatus above described may be of any convenient dimensions; and the charge in the tube 11 may be subjected to the action of alternating electric currents, the magnetic field in which it is being treated in the tube being of about four hundred and forty to four hundred and eighty oscillations per second. Saccharification, by this electric treatment, having been carried to the desired point, neutralization may be effected in the usual way, using soda-ash, to a point of approximate neutrality to methyl orange. Filtration, refining and concentration may then be carried out according to well known methods.

While I have mentioned the use of alternating electric currents in carrrying out the preferred form of this invention, I do not intend to limit myself to any particular form of electric current, as any electric current may be resorted to without departing from the scope of this invention. And I also desire it to be clearly understood that in using the word "modified", I do not intend to limit the extent of modification or conversion to the range of modification of commercial thin boiling starches, but intend to include any appreciable extent of modification. Furthermore, it is obvious that various changes, from the practice herein set forth, may be adopted while still operating within the principles of this invention, hence I do not intend that the invention as pointed out in the claims shall be limited by the preferred practice hereinbefore described; but

What I claim is:—

1. The method of producing a predigested edible product comprising first, providing a modified starch and second subjecting it to the action of an electric current for the purpose of further conversion.

2. The method of producing a predigested edible product comprising first, providing a purified modified starch and second, subjecting it to the action of an electric current for the purpose of further conversion.

3. The method of producing a predigested edible product comprising first, providing a purified modified starch, second, cooking it, and third, subjecting it to the action of an electric current for the purpose of further conversion.

4. The method of producing a predigested edible product comprising first, providing a modified starch, second, cooking it, third, subjecting it to the action of an electric current for purpose of further conversion, and fourth, refining the product.

5. The method of producing a predigested edible product comprising first, providing a purified modified starch, second, cooking it, third, subjecting it to the action of an electric current for the purpose of further conversion, and fourth, refining and concentrating the product.

6. The method of producing a predigested edible product comprising first, providing a modified starch by acid hydrolysis, and second, subjecting it to the action of an electric current for the purpose of further conversion.

7. The method of producing a predigested edible product comprising first, providing a purified modified starch by acid hydrolysis, and second, subjecting it to the action of an electric current for the purpose of further conversion.

8. The method of producing a predigested edible product comprising first, providing a purified modified starch by acid hydrolysis, second, cooking it, and third, subjecting it to the action of an electric current for the purpose of further conversion.

9. The method of producing a predigested edible product comprising first, providing a purified modified starch by acid hydrolysis, second, cooking it, third, subjecting it to the action of an electric current for the purpose of further conversion, and fourth, refining and concentrating the product.

In testimony that I claim the foregoing as my invention, I have signed my name in presence of two witnesses, this sixteenth day of February, 1910.

CHESTER B. DURYEA.

Witnesses:
F. GEORGE BARRY,
HENRY C. THIEME.